US00RE39661E

(19) United States
(12) Reissued Patent
Pegues, Jr. et al.

(10) Patent Number: US RE39,661 E
(45) Date of Reissued Patent: May 29, 2007

(54) SATELLITE DISH MOUNTING ARM

(76) Inventors: Thomas C. Pegues, Jr., 234 SW. 44th Ter., Cape Coral, FL (US) 33914; Eugene L. Hood, 229 SW. 44th Ter., Cape Coral, FL (US) 33914

(21) Appl. No.: 10/207,727

(22) Filed: Jul. 29, 2002

Related U.S. Patent Documents

Reissue of:
(64) Patent No.: 6,195,066
Issued: Feb. 27, 2001
Appl. No.: 09/483,820
Filed: Jan. 15, 2000

U.S. Applications:
(60) Provisional application No. 60/116,277, filed on Jan. 19, 1999.

(51) Int. Cl.
*H01Q 1/12* (2006.01)

(52) U.S. Cl. ..... 343/878; 343/883; 343/890; 343/892; 248/237; 52/27

(58) Field of Classification Search ..... 343/765, 343/766, 840, 880, 882, 878, 890, 891, 892, 343/DIG. 2, 883; 52/27, 40; 248/201, 237
See application file for complete search history.

(56) References Cited

U.S. PATENT DOCUMENTS 3,977,645 A * 8/1976 Deely ..... 248/484
4,181,284 A * 1/1980 Seppelfrick ..... 248/514
4,453,695 A * 6/1984 Sennott et al. ..... 248/660
4,656,486 A * 4/1987 Turner ..... 343/882
4,672,389 A * 6/1987 Ulry ..... 343/915
4,723,128 A * 2/1988 Gasque, Jr. ..... 343/880
4,783,662 A * 11/1988 Wirth et al. ..... 343/757
4,863,133 A * 9/1989 Bonnell ..... 248/280.11
5,082,037 A * 1/1992 Hammons et al. ..... 144/286.5
5,581,962 A * 12/1996 Davis et al. ..... 52/148
5,647,567 A * 7/1997 Pugh et al. ..... 248/237
5,961,092 A * 10/1999 Coffield ..... 248/539
6,037,913 A * 3/2000 Johnson ..... 343/882
6,105,594 A * 8/2000 Diaz ..... 135/16
6,727,861 B2 * 4/2004 Antoine ..... 343/878

* cited by examiner

*Primary Examiner*—Tho Phan
(74) *Attorney, Agent, or Firm*—William E. Nonan

(57) ABSTRACT

The invention is directed to a self supporting cantilever support apparatus for mounting a satellite dish antenna to a building having a sidewall. The apparatus consists of a square, steel receiver tube having a foot plate mounted on one end and a square, steel telescope tube inserted and adjustably mounted within the receiver tube. The satellite dish is screwed onto the hour glass shaped plate affixed to the telescope tube. Slotted holes formed in the hour glass shaped plate to accommodate the many different types of satellite dishes. The co-axial cable is threaded through a hole in the telescope tube, through the two tubes and out through a hole formed in the bottom of the receiver tube.

8 Claims, 7 Drawing Sheets

SATELLITE DISH MOUNTING ARM

Matter enclosed in heavy brackets [ ] appears in the original patent but forms no part of this reissue specification; matter printed in italics indicates the additions made by reissue.

RELATED APPLICATION

This application is a Continuation-In-Part of provisional application Ser. No. 60/116,277, filed on Jan. 19, 1999.

BACKGROUND OF THE INVENTION

1. Field of the Invention

The invention relates generally to satellite dishes, and more specifically, the invention relates to a self supporting cantilever support arm which gets the satellite dish above the roof line without attaching the dish directly to the roof, fascia, or soffit.

2. Background of the Invention

In an emerging technology, which is known as Direct Broadcast Satellite (DBS), small, dish-shaped antennas are used to receive television signals, which are broadcast by satellites in geosynchronous orbits.

Various mounts for mounting small, dish-shaped antennas or other antennas on horizontal surfaces or on sloped roofs are exemplified in prior art patents including U.S. Pat. No. 4,510,502 to Hovland et al which discloses a dish antenna mounting structure including an upright mast for supporting the dish antenna. The mast has an upper end for attachment to the dish and a lower end for anchoring to a rigid type structure. The structure also has a bent strut having a lower end for anchoring to a rigid-type structure and an upper end for attachment to the mast.

U.S. Pat. No. 5,334,990 to Robinson discloses a portable satellite dish antenna system comprising a dish-shaped member having an inner surface that includes a central flat area and a plurality of annular parabolically-shaped segments concentric with the central circular flat area for providing a plurality of focal points over the inner surface of the dish-shaped member.

U.S. Pat. No. 5,617,680 to Beatty discloses a satellite dish mounting structure having an elevated bridge portion for supporting a mounting foot of the satellite dish. The bridge portion is integrally connected to and supported by two narrow leg positions which in turn are integrally connected to and supported by two narrow foot portions. The bridge portion is elevated from two top portions by the leg portions in order to clear the uneven surface of the roof or wall of the house.

U.S. Pat. No. 5,647,567 to Pugh, Jr. et al discloses an antenna mounting bracket that reinforces the eaves of a building roof. The bracket has a telescoping support having a rigid tubular form. The telescoping support has a back plate on one end that is secured to the sidewall of the building adjacent to the eave of the building. The telescoping support is braced by a brace.

U.S. Pat. No. 5,829,724 to Duncan discloses a primary strut, which is tubular, and has a straight, upper portion, a straight intermediate portion, and a straight, lower portion. The upper portion is bent at a juncture between the upper and intermediate portions and at a lower juncture between the intermediate and lower portions.

It is important that a satellite dish, whatever the size, have an unobstructed view of the sky in the direction of the location of a broadcasting satellite. To achieve this unobstructed southern exposure, the manufacture's mounting recommendations for these small satellite dish systems are limited to three choices: strapped to a chimney; mounted on top of a pitched roof; or positioned adjacent to the southern wall of a building. Another method of mounting the satellite dish is mounting the dish to the eave of the building. Unfortunately, a problem arises due to the inherent structural weakness of a typical household eave. Even the manufacturer's of the small dish antenna specifically advise users to avoid mounting on the eave of a house because of the eave's lack of rigidity.

A need has a risen, to which this invention is addressed, for an antenna-mounting structure that can be readily adapted for mounting an antenna, such as a small, dish-shaped antenna, to a vertical wall.

The instant invention is designed to overcome the problems and difficulties with prior art dish antenna mountings which are obviated by the present invention.

SUMMARY OF THE INVENTION

The instant invention, is a self supporting cantilever support arm which gets the satellite dish above the roof line without attaching the dish directly to the roof, fascia, or soffit, thus eliminating pathways for water penetration into the roof system. The arm consists of a square receiver tube having a wall mount plate affixed to one end, three screw nuts mounted on one side of the arm, two for holding set screws and the third for mounting a ground screw. The locations of the holes in the foot plate make it possible to mount the wall mount plate on all types of structure walls such as concrete block, frame with various veneers, etc. At the wall mount plate end of the receiver tube, a bolt is provided to attach a ground wire for the dish.

A telescope tube, having a dish assembly foot plate, is fit into the receiver tube and the required length is set. The dish assembly foot plate has slotted holes to accommodate all major brands of satellite dishes. At the front bottom of the telescope tube, a hole is provided for routing the dish hookup co-axial cable through the arm assembly.

With the mounting of the instant invention, a greater versatility in choosing dish mounting locations is provided. The arm adjusts to an overhang with or without a gutter. The arm is made of heavy gauge steel with all stainless hardware and is completely assembled ready for installation. It is universal and will accept all major brands of satellite dishes and mounts to solid concrete, concrete blocks, brick, stone or framed wall with suitable veneer.

DETAILED DESCRIPTION OF THE PREFERRED EMBODIMENTS

Figure 1:
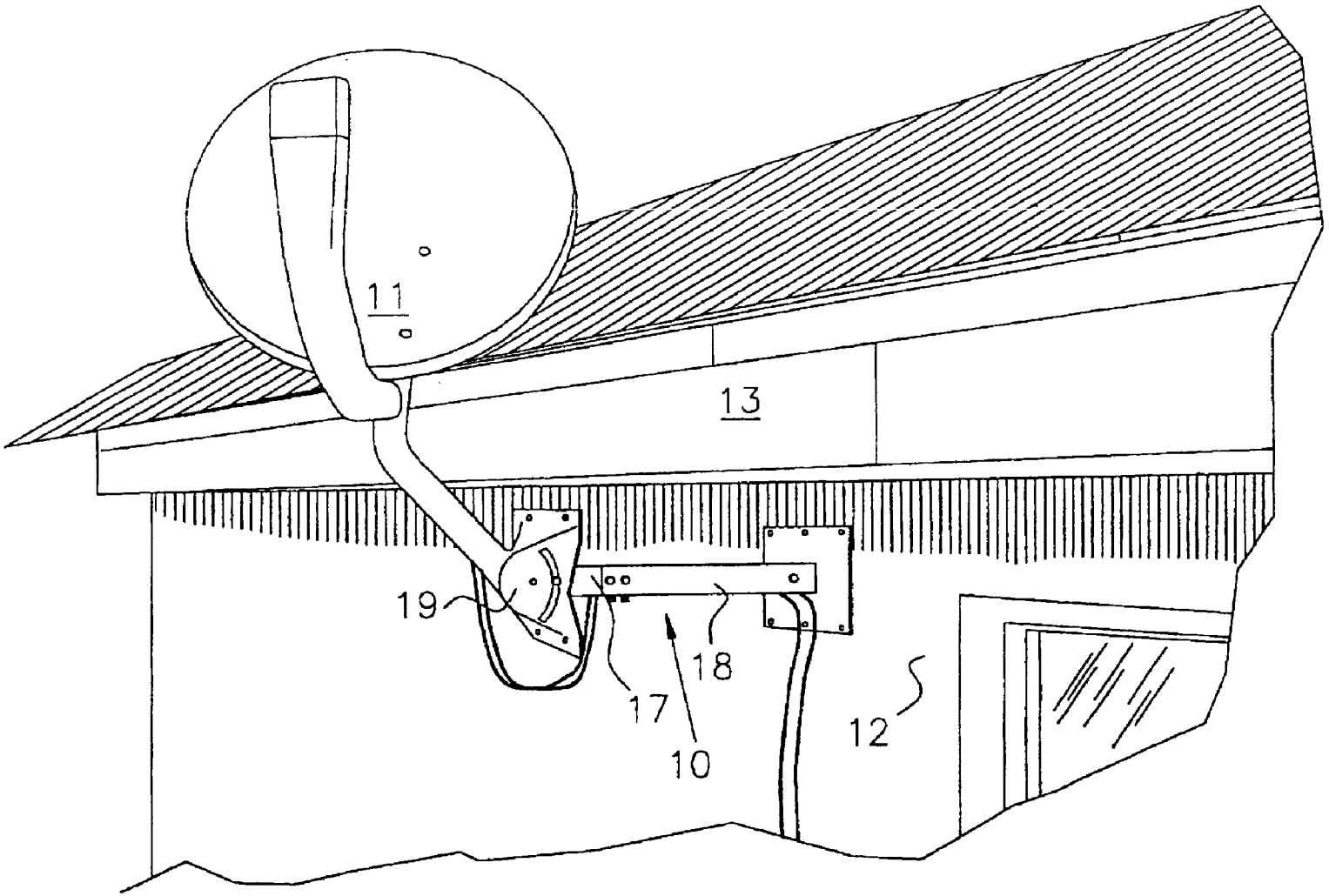
FIG. 1 is a front perspective view of the invention installed under an eave.

Referring now to the drawings wherein the like numerals designate like and corresponding parts throughout the several views, in FIG. 1 the wall mounted cantilevered telescoping arm 10, which supports small TV satellite dishes 11 and other small data receiver dishes mounts to a suitable structure walls 12 of concrete block, frame with various veneers, etc. The arm 10 will hold dish assemblies 11 to soffit, fascia, or any other part of a roof structure, without bracing. The arm 10 locates the dish assembly 11 above the roof line. The arm 10 eliminates the use of a pole mounting, and will adjust to clear the eave 13 or irregular jogs in walls.

The arm 10 is universal and will fit all major brands of dish assemblies; RCA Types, SONY, Hughes, Panasonic, etc. The arm 10 consists of the following: the fixed receiver 14 with wall mounting plate 15, and the telescoping dish mount assembly 16. The fixed receiver 14, with wall mounting plate 15, consists of a steel, square receiver tube 18 which is attached plumb to a generally square foot plate 15. Square, threaded nuts 30 are welded to a side of the receiver 14. At the plate 15 end of receiver tube 18, a bolt 22 is threaded into threaded nut 30 to attach a ground wire for the dish 11.

Figure 6:
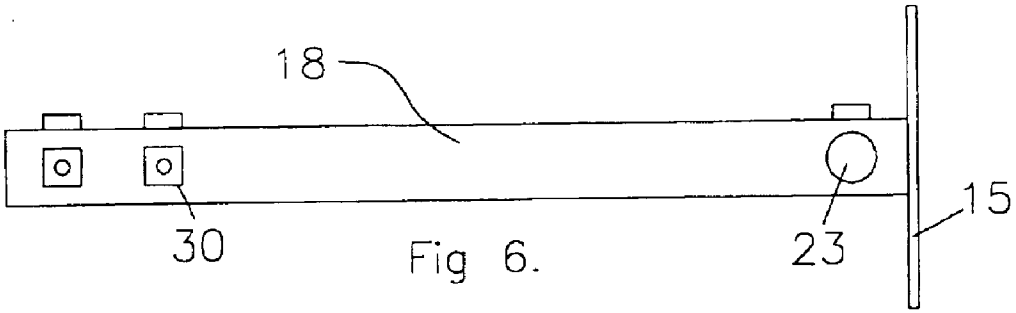
FIG. 6 is a bottom view of the receiver arm in accordance with the invention.
Figure 7:
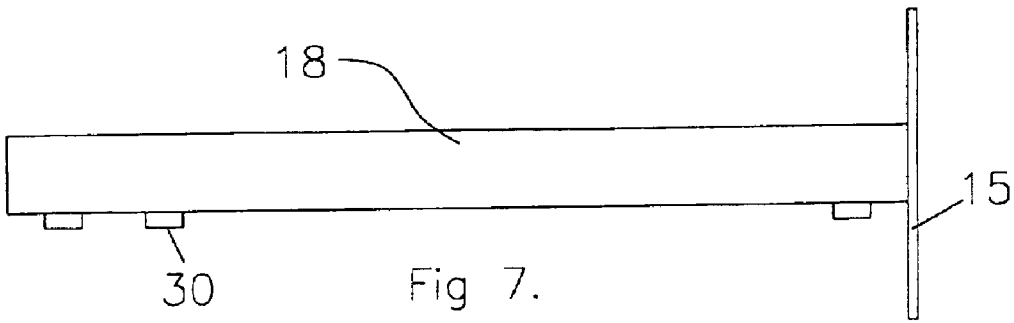
FIG. 7 is a top view of the receiver arm in accordance with the invention.

As shown in FIG. 6, a round hole 23 is formed for routing dish 11 hookup co-axial cable through the arm 100 assembly. At the front of receiver tube 18, bottom and right sides, are two each, respectively, set/adjusting screws 24 for adjusting the length of telescope tube 17. The two sets of screws 24, reach into receiver tube 10 to press against the telescope tube 18 to provide a firm contact between the receiver tube 18 and the telescope tube 17 to prevent any play between the two parts and the firm contact between the walls of the two parts provides greater strength to resist wind forces.

Figure 2:
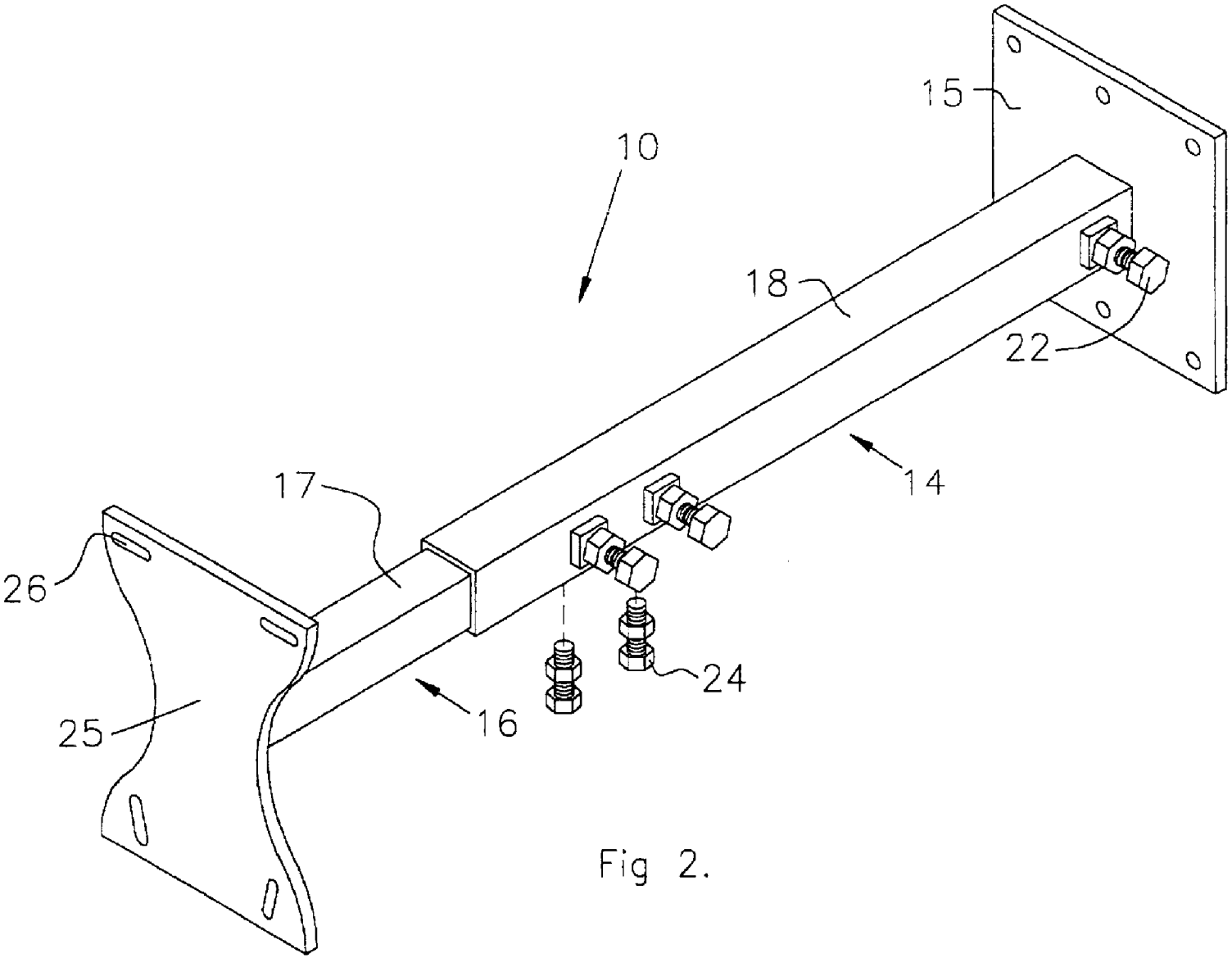
FIG. 2 is a top perspective view of the cantilevered, telescoping satellite dish mounting arm in accordance with the invention.
Figure 3:
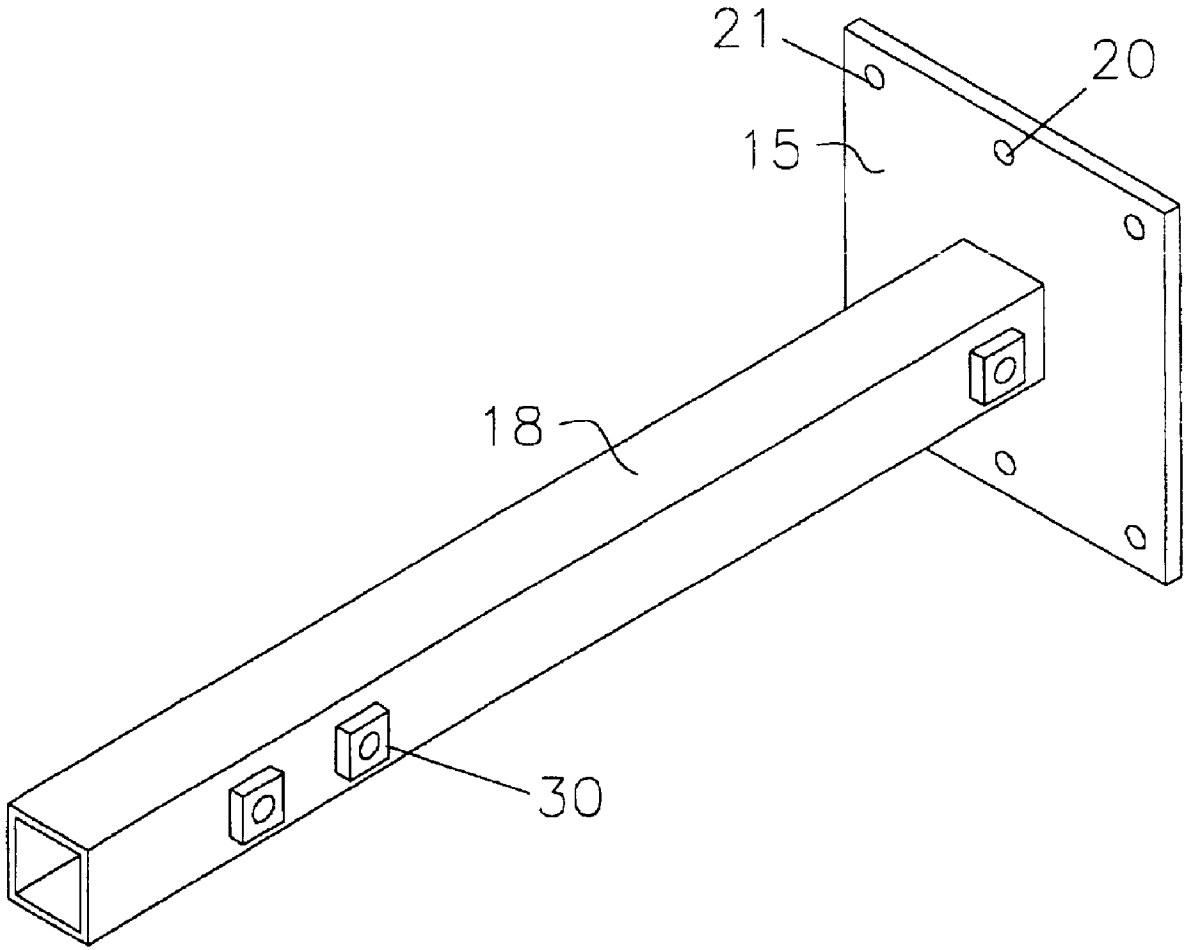
FIG. 3 is a top, front, perspective view, of the receiver tube in accordance with the invention.
Figure 8:
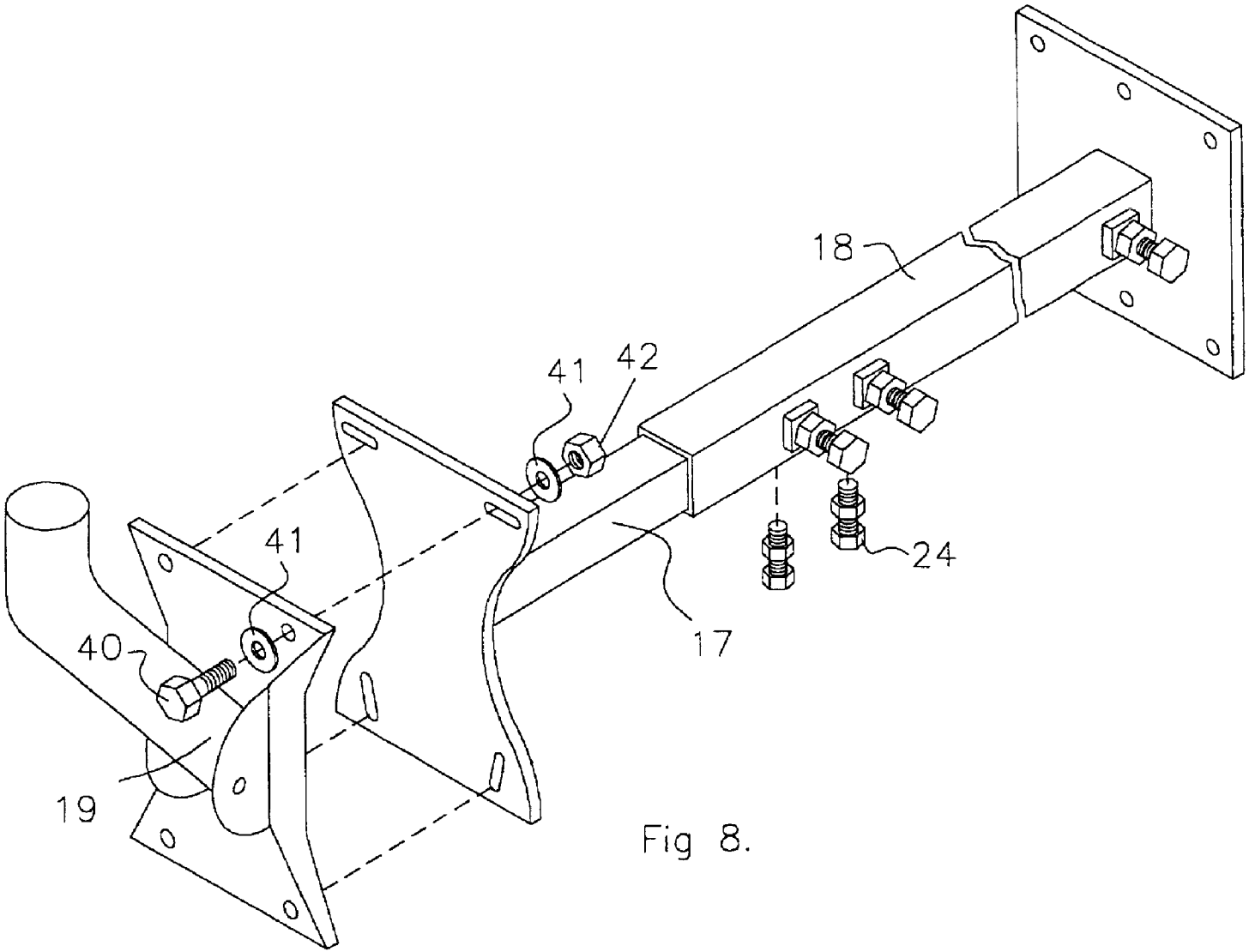
FIG. 8 is a top perspective view of the telescoping dish mount assembly, partly in section.
Figure 9:
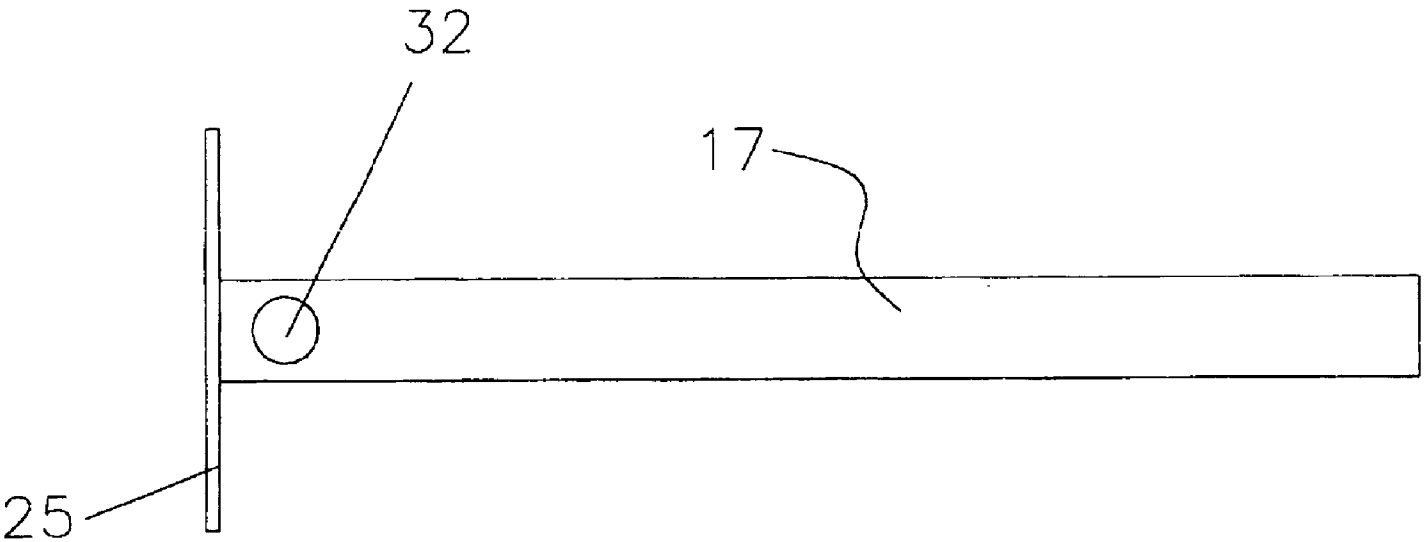
FIG. 9 is a bottom view of the telescope tube showing the co-axial cable routing hole.

As shown in FIG. 2, the telescoping dish mount assembly 16 consists of a square, steel, telescope tube 17 which is attached plumb to the center of a generally hour glass shaped steel plate 25. The plate 25 is for attaching the satellite dish assembly 11 at the foot 19 with bolts 40, washers 41 and nuts 42 as shown in FIG. 8. Slotted holes 26 are formed at the top end and bottom end of plate 25 to accommodate the different hole locations in the existing dish antennas.

The foot plate 15 is mounted to the exterior structure wall 12. The holes 20, 21 in the mounting plate 15 are for mounting to concrete block, brick, veneer, and the like. The attachment would be with concrete screws or anchor sleeves with anchor bolts. A spirit level is used to level the foot plate 15. It is important to assure that the self supporting cantilevered telescoping arm 10 is both level with respect to the top or bottom edge of the foot plate 25 and plumb with respect to the face of the foot plate 25 in order to permit the precise tuning and pointing of the dish 11 according to instructions printed on the dish 11.

Figure 4:
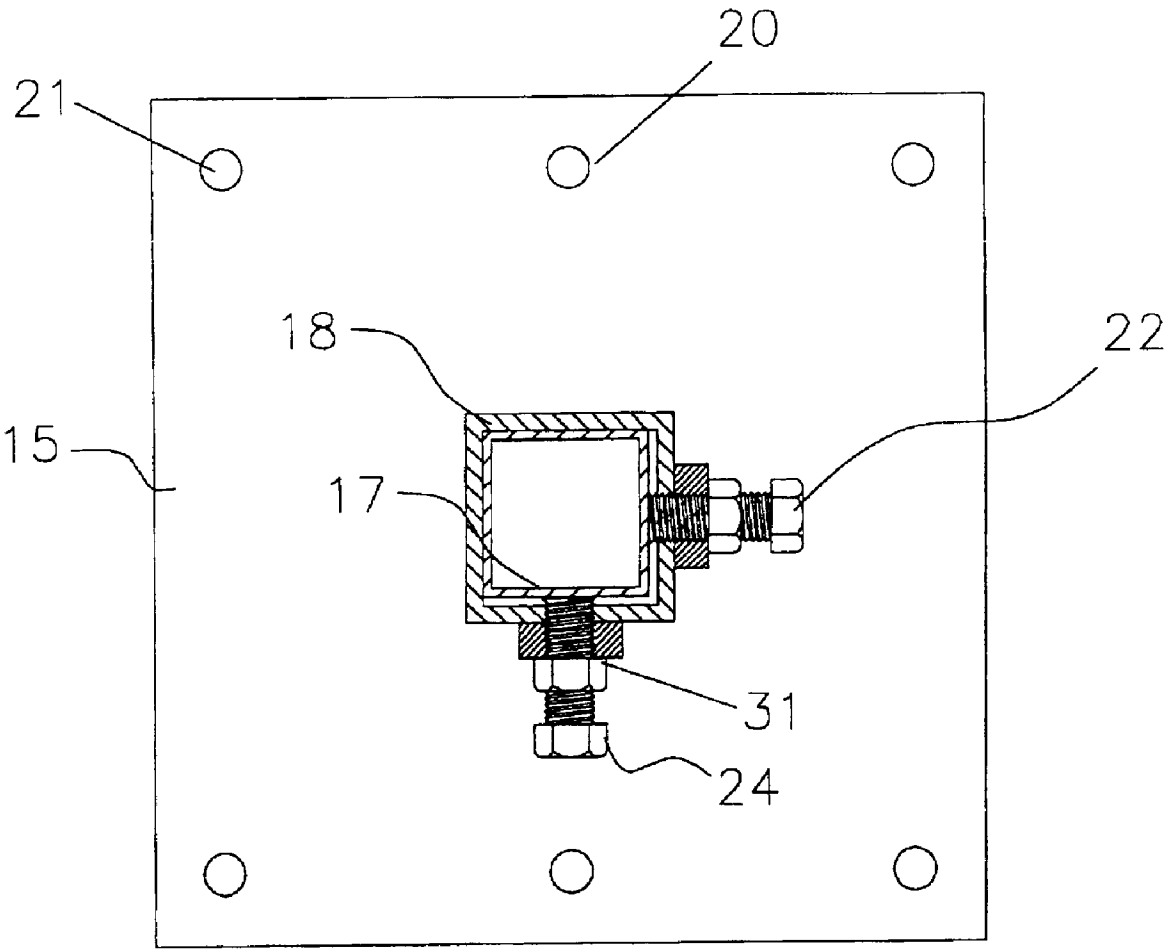
FIG. 4 is a front view of the receiver tube and the telescope tube, partially in section.
Figure 5:
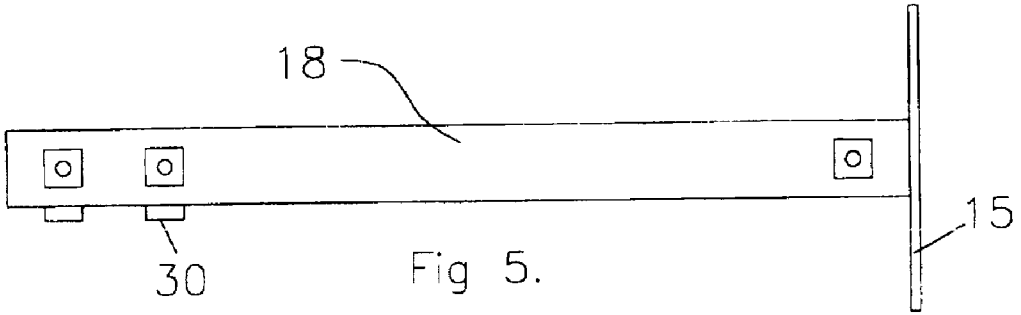
FIG. 5 is a right side view of the receiver arm in accordance with the invention.

As shown in FIG. 4, the telescope tube 17 is inserted into the receiver tube 18 and adjusted to the desired unit length. The set/adjustment screws 24 are then tightened to push the telescope tube 17 firmly to the top and left side of the receiver tube 18. Jamb nuts 31 are tightened to assure that adjusting screws 24 are firmly set. The slotted holes 26 at the top and bottom of the foot plate 25 will accommodate all major brands of satellite dishes. The co-axial cable is then fed through the hole 32, through the telescope tube 17, through the receiver tube 18 and out through hole 23 in the receiver tube 18. A ground wire for the dish 11 may then be attached to bolt 22.

Thus it will be appreciated that the present invention provides a novel telescoping satellite dish mount that may be used whatever a satellite dish is mounted. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. A self supporting cantilever support apparatus for mounting a satellite dish antenna to a building having a sidewall, the apparatus consisting of:

a fixed, steel, square, receiver tube having a first end and a second end and a right side and a bottom side, said tube having a square foot plate affixed to said first end, said square foot plate having a top end and a bottom end, said receiver tube having a square thread nut affixed on said right side near said first end, two square threaded nuts affixed to said right side near said second end, and two square threaded nuts affixed on said bottom side near said second end, and a round hole formed in said bottom side near said first end, a square, steel, telescope tube having a bottom, a first end and a second end, said telescope tube having a generally hour glass shaped plate affixed to said first end and a hole formed in said bottom near said first end, said hour glass shaped plate having a top end and a bottom end, said telescope tube being inserted and adjustably mounted within said receiver tube, said telescope tube being adapted to support said dish antenna, and set screws screwed into said two square threaded nuts affixed on said right side of said receiver tube and set screws screwed into said two square threaded nuts affixed on said bottom side of said receiver tube, near said second end, each of said set screws having a jamb nut mounted thereon for locking said set screws in a selected position.

2. A self supporting cantilever support apparatus of claim 1 wherein said hour glass shaped plate is formed with two horizontal slotted holes at said top end and two angled slotted holes formed at said bottom end.

3. A self supporting cantilever support apparatus of claim 1 wherein said square foot plate is formed with three mounting holes formed in said top end and three mounting holes formed in said bottom end.

4. A self supporting cantilever support apparatus for mounting a satellite dish antenna to a building having a sidewall, the apparatus consisting of:

a fixed, steel, square, receiver tube having a first end and a second end and a right side and a bottom side, said tube having a square foot plate affixed to said first end, said square foot plate having a top end formed with three mounting holes and a bottom end formed with three mounting holes, said receiver tube having a square thread nut affixed on said right side near said first end, two square threaded nuts affixed to said right side near said second end, and two square threaded nuts affixed on said bottom side near said second end, and a round hole formed in said bottom side near said first end, a square, steel, telescope tube having a bottom, a first end and a second end, said telescope tube having a generally hour glass shaped plate affixed to said first end and a hole formed in said bottom near said first end, said glass shaped plate having a top end formed with two horizontal slotted holes and a bottom end formed with two angled slotted holes, said telescope tube being inserted and adjustably mounted within said receiver tube, said telescope tube being adapted to support said dish antenna, and set screws screwed into said two square threaded nuts affixed on said right side of said receiver tube and set screws screwed into said two square threaded nuts affixed on said bottom side of said receiver tube, near said second end, each of said set screws having a jamb nut mounted thereon for locking said set screws in a selected position.

*5. A self supporting cantilever support apparatus for mounting a satellite dish antenna to a building having a sidewall and an eave that extends outwardly from the sidewall proximate an upper edge thereof, said apparatus comprising:*

*a first tube for attaching fixedly to the sidewall;*

*a second tube telescopically and slidably interengaged with said first tube and carrying at an outer end thereof an outer mounting bracket for supporting the satellite dish; and*

*at least one fastener for releasably interengaging said first and second tubes and locking said second tube at a selected position relative to said first tube, said interengaged tubes being attachable to the sidewall of the building at an inner end of said first tube exclusively and otherwise being detached from the eave of the building along the entire length of said interengaged tubes to define a self-supporting cantilever for supporting the antenna dish clear of the eave without bracing.*

*6. The apparatus of claim 5 in which each said tube includes a like rectangular cross sectional shape.*

*7. The apparatus of claim 5 further including an inner mounting bracket for attaching said inner end of said first tube to the sidewall.*

*8. A self supporting cantilever support apparatus for mounting a satellite dish antenna to a building having a sidewall and an eave that extends outwardly from the sidewall proximate an upper edge thereof, said apparatus comprising:*

*a fixed tube having first and second ends;*

*a telescope tube having first and second ends, said telescope tube having a plate affixed to said first end, said plate being adapted to support said dish antenna, said telescope tube being telescopically interengaged with said fixed tube;*

*one of said tubes having at least one threaded hole formed therein; and*

*a set screw screwed into said threaded hole for bearing against the other tube and selectively locking said telescope tube at a selected position relative to said fixed tube, said interengaged tubes being attachable to the sidewall of the building at an inner end of said fixed tube exclusively and otherwise being detached from the eave of the building along the entire length of said interengaged tubes to define a self-supporting cantilever for supporting the antenna dish clear of the eave without bracing.*

* * * * *